United States Patent [19]

McKelvey

[11] Patent Number: 4,743,285
[45] Date of Patent: May 10, 1988

[54] GLASS BENDING APPARATUS WITH RETRACTABLE BELTS AND METHOD FOR USING SAME

[75] Inventor: Harold E. McKelvey, Northville, Mich.

[73] Assignee: Shatterproof Glass Corp., Detroit, Mich.

[21] Appl. No.: 891,948

[22] Filed: Jul. 30, 1986

[51] Int. Cl.$^4$ ............................................. C03B 23/025
[52] U.S. Cl. ........................................ 65/107; 65/103; 65/273; 65/286
[58] Field of Search ................. 65/106, 107, 103, 286, 65/287, 289, 290, 291, 273

[56] References Cited

U.S. PATENT DOCUMENTS 3,077,753  2/1963  Dammers ............................ 65/106
4,226,608  10/1980  McKelvey ........................... 65/106

Primary Examiner—Arthur Kellogg
Attorney, Agent, or Firm—Brooks & Kushman

[57] ABSTRACT

Glass which is heated to a softened state is bent from a generally planar state to a curved form while being transported on a moving conveyor made up of a plurality of generally parallel belts. The contour of the conveyor varies from being generally flat adjacent the apparatus inlet to being significantly curved adjacent the apparatus outlet. The softened glass sags under its own weight to conform to the varying conveyor contour.

20 Claims, 6 Drawing Sheets

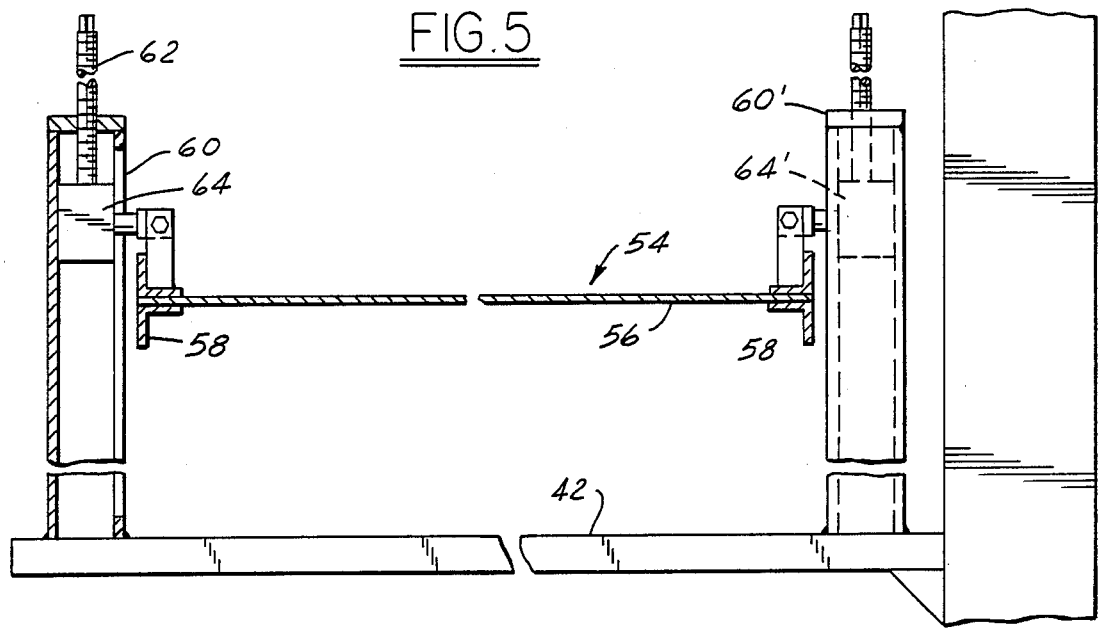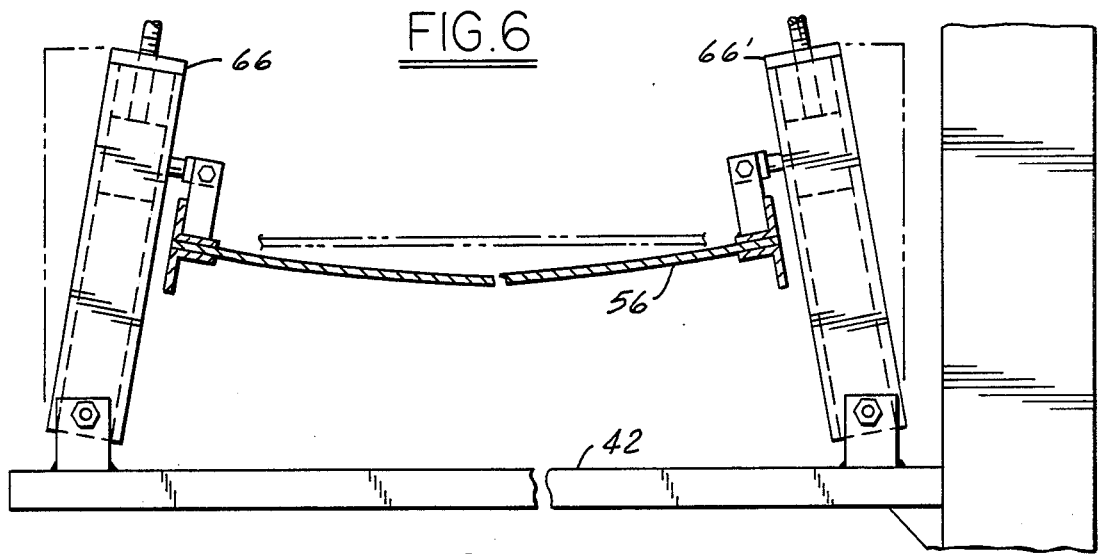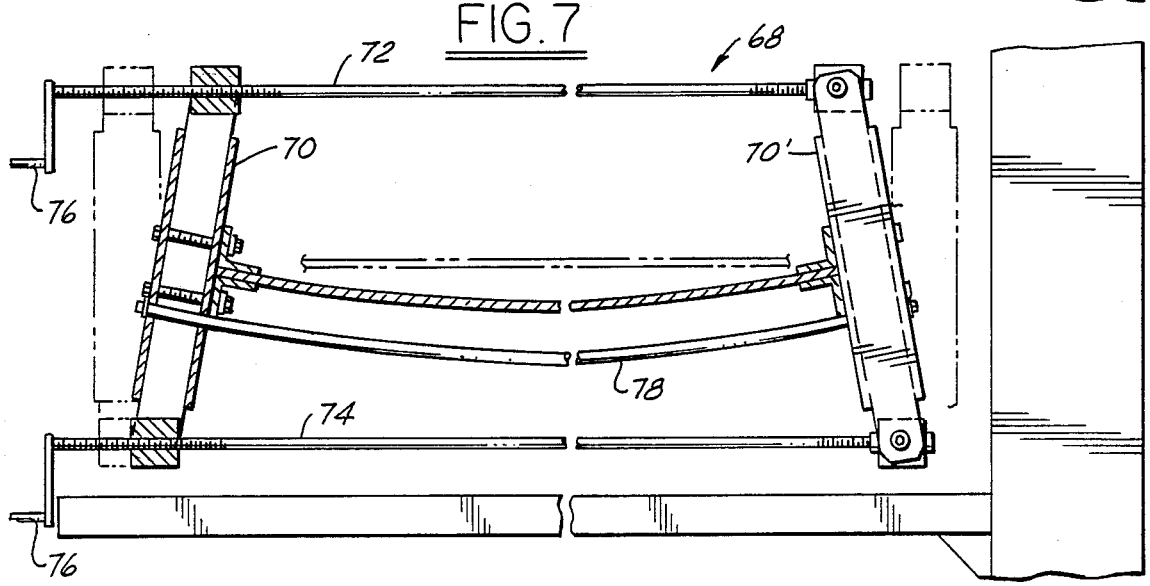

4,743,285

GLASS BENDING APPARATUS WITH RETRACTABLE BELTS AND METHOD FOR USING SAME

DESCRIPTION

Field of Invention

The present invention relates to an apparatus for bending glass and more particularly, to apparatuses for bending glass above a single axis.

BACKGROUND OF INVENTION

The invention has particular utility for forming curved, tempered-glass sheets such as are currently used for automobile windows, and hence will be described in detail with reference thereto.

In recent years, there has been a greatly-increased demand for automobile windows of relatively thin, curved tempered glass. During this time efforts have continued to produce, by various methods and means, thin, curved tempered glass sheets of the highest quality to meet the even increasing and exacting requirements of the automotive industry.

It is an object of this invention to provide an apparatus and method whereby thin, curved tempered glass sheets of exceptionally high quality possessing consistent accurately-controlled curvatures can be manufactured on a continuous, high-production basis at relatively low cost and with minimum breakage or scrap losses.

It is further an object of this invention to provide an apparatus and method for forming curved, tempered glass sheets where the glass is smooth and free of surface irregularities.

The advantage of this method and apparatus which is the subject of this invention is that smooth, consistent curved glass sheets of high quality may be formed continuously with minimal handling.

The advantage of this invention is that the apparatus may be readily adjusted in order to vary the curvature of the glass sheet.

These, along with other objects, features, and advantages of the invention will appear more clearly from the following description of a preferred embodiment thereof, with reference to the accompanying drawings.

BRIEF DESCRIPTION OF THE DRAWINGS

FIG. 5 is an enlarged partial cross-sectional view of the apparatus taken along line 5—5 in FIG. 1;

FIG. 6 is an enlarged partial cross-sectional view taken along line 6—6 in FIG. 1;

FIG. 7 is an enlarged partial cross-sectional view taken along line 7—7 in FIG. 1;

DESCRIPTION OF THE PREFERRED EMBODIMENT

Figure 1:
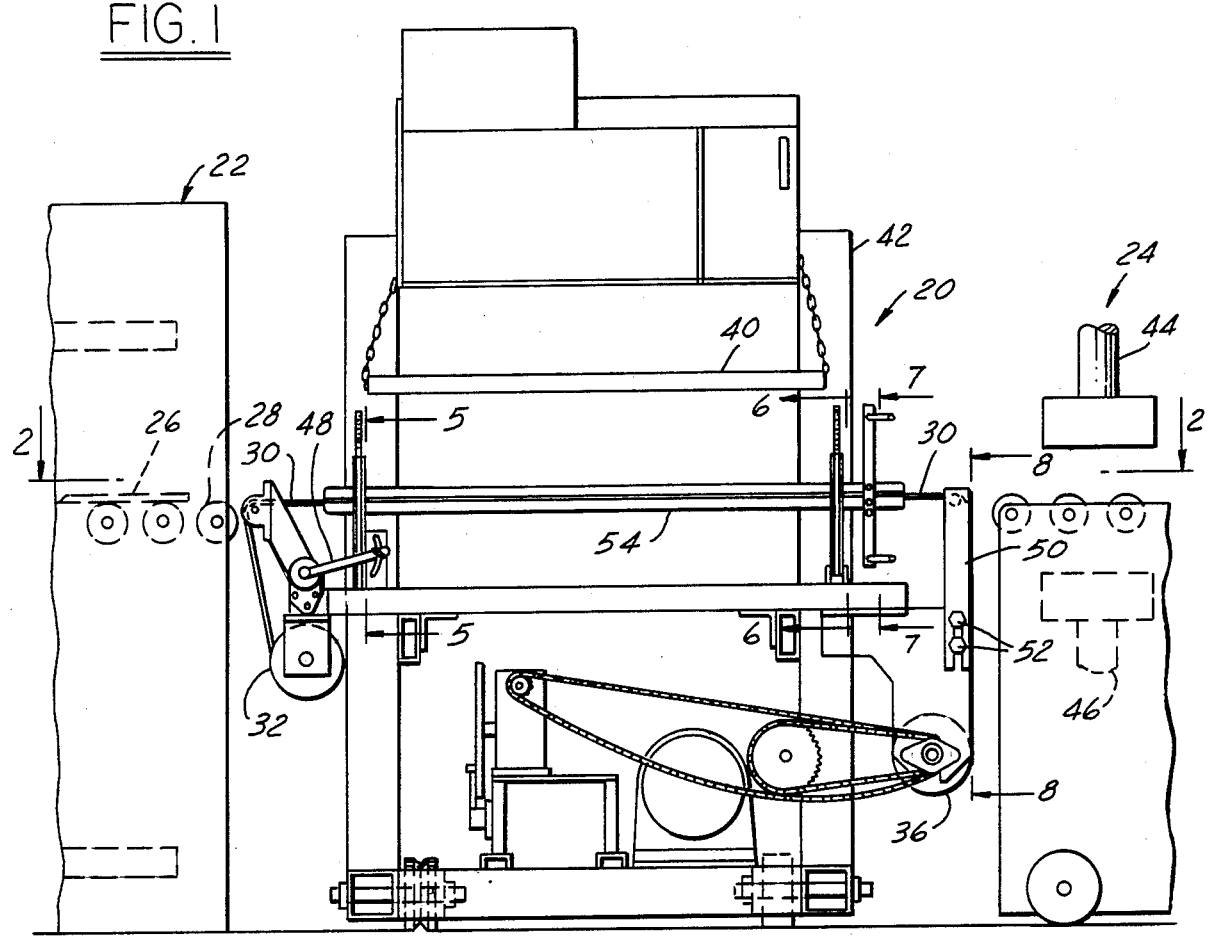
FIG. 1 is a side elevation of the glass bending apparatus.
Figure 2:
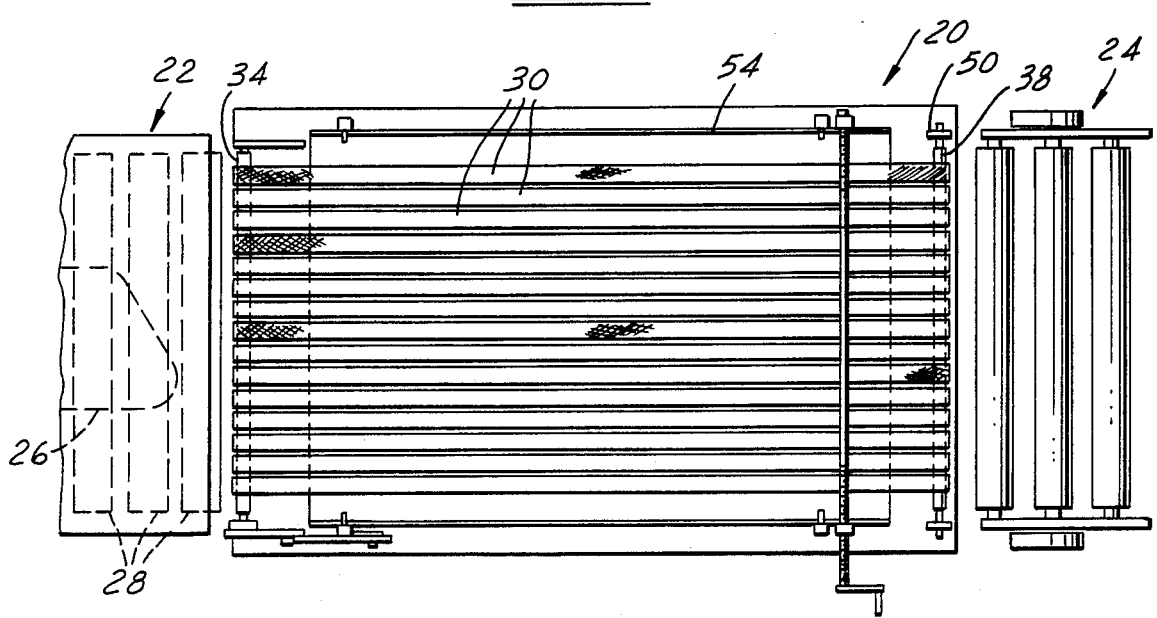
FIG. 2 is a top cross-sectional view of the glass bending apparatus of FIG. 1, taken along line 2—2.

The preferred embodiment of the present invention is illustrated by way of example in FIGS. 1-18. With specific reference to FIGS. 1-4 an overall view of the preferred embodiment of the glass bending apparatus 20 is shown. The bending apparatus is located between a glass furnace 22 and a tempering device 24. The furnace, bending apparatus and tempering device are located in line adjacent to one another to allow glass sheets to be transported generally horizontally therebetween. A glass furnace, tempering device and an earlier bending apparatus are described in U.S. Pat. No. 4,441,909 (McKelvey, et al), which is incorporated herein by reference.

Glass sheets which are preferably already cut to their final size are heated in furnace 22 to the softening point of the glass, typically about 1200° F. The glass sheet 26 is transported through the furnace 22 on a plurality of rotating rollers 28. As the glass exists the furnace, it enters the bending apparatus 20 and is supported on a plurality of narrow belts 30 which form a moving conveyor. As the glass progresses through the bending apparatus, the contour of the belts changes to conform with the desired curvature of the glass sheet. The glass will sag under its own weight to conform with the belt curvature and the curved glass sheet will exit the apparatus moving to the tempering device 24 where it is rapidly cooled.

Figure 3:
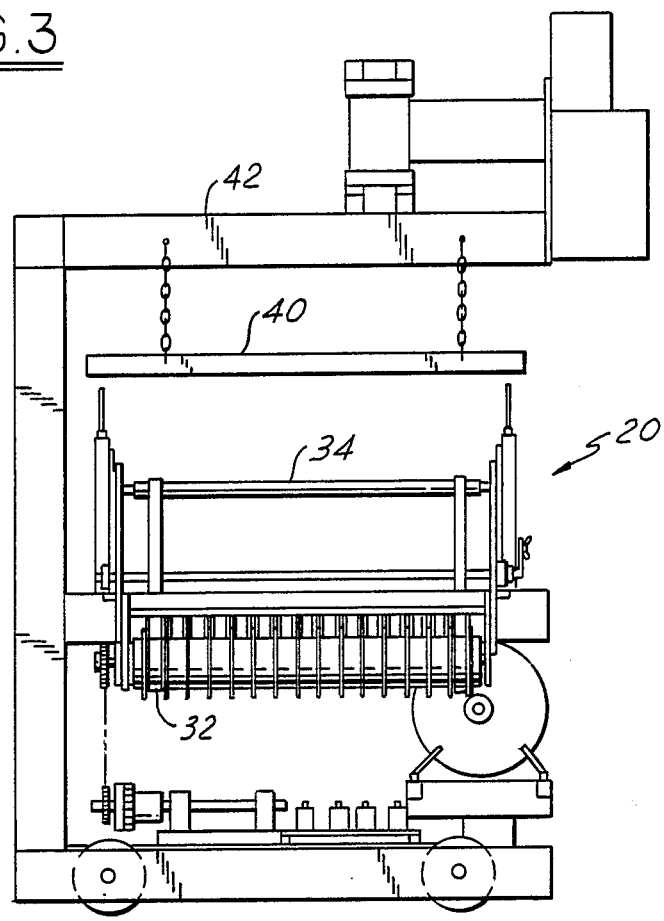
FIG. 3 is a left side view of the apparatus of FIG. 1.
Figure 4:
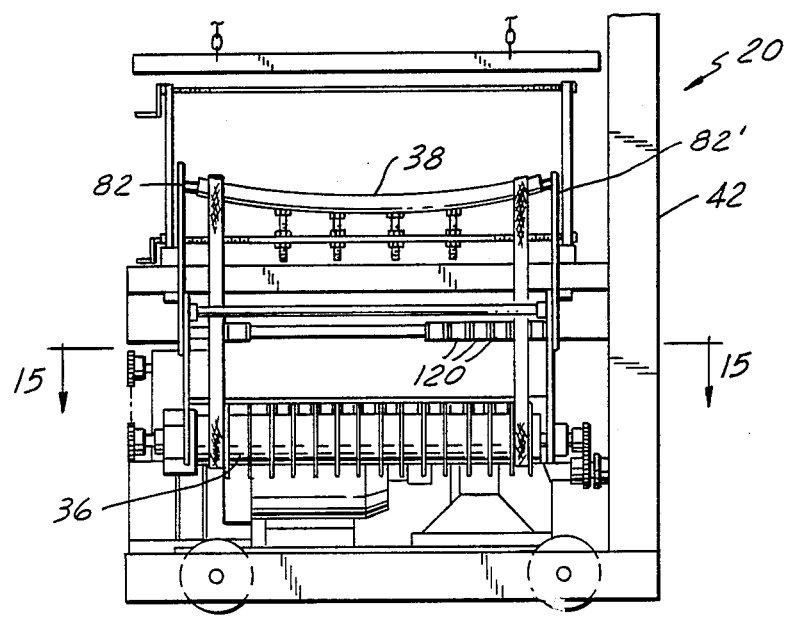
FIG. 4 is a right side view of the apparatus of FIG. 1.

The entry and exit ends of the bending apparatus 20 are shown in FIGS. 3 and 4 respectively with all but the outside two belts 30 removed so as to expose the underlying mechanism. At the entry side of the bending apparatus, belts 30 are shown extending from reel assembly 32 about inlet guide bar 34. Inlet guide bar is generally horizontal, however, it could be made slightly concave. The outlet end of the bending apparatus is shown in FIG. 4. The belts are shown extending from a spool assembly 36 to an outlet guide bar 38. The plurality of belts 30 extending from the reel 32 about inlet guide bar 34 to the outlet guide bar 38, provide a substantially continuous surface for supporting the softened glass. The outlet guide bar forms a curved support for the belts which extend generally horizontally between the inlet and outlet guide bars. The curvature of the outlet guide bar may be adjusted to any desired shape. The contour of the belts extending between the guide bars varies from a generally flat surface at the inlet to a significantly curved surface at the bending apparatus outlet allowing the glass to gradually deform to the curved state while being continuously supported as it moves through the apparatus on the moving surface provided by plurality of belts 30.

When tempered glass sheets are being formed, such as that typically required for automobile windows, it is quite desirable that the glass exiting the bending apparatus be of a sufficiently high temperature to achieve thorough tempering in the tempering device. Typically a temperature of 1160° to 1175° F. at the exit side of the bending apparatus will result in satisfactory tempering. It is therefore necessary to move the glass relatively quickly through the bending apparatus so that it does not cool below the desired exit temperature. Preferably supplemental heating in the bending apparatus will not be necessary to maintain the desired exit temperature which should be above the upper temperature limit of the annealing range of 1050° to 950° F. In order to maintain the temperature of the glass, an insulating shield 40 is suspended from the bending apparatus frame 42 and oriented directly above the glass supported on the belt surface. It is not desirable to heat the glass above 1200° F. in the furnace since the glass will become too soft to be handled. When the glass enters the tempering device the glass will be rapidly cooled or quenched by streams of air directed on the glass by upper and lower blast heads 44 and 46. To achieve proper tempering the glass must be quickly cooled to the lower limit of the temperature range, i.e., approximately 950° F. The rate of cooling to achieve optimum temperature varies as a function of glass thickness. Glass of $\frac{1}{8}''$ in thickness must be cooled in the tempering device to 950° F. within approximately 7 seconds. With glass $\frac{1}{4}''$ in thickness, cooling to the quenching temperature of 950° F. must be achieved within 15 seconds. The glass is further cooled in the tempering device to lower the temperature of the glass for handling purposes. The temperature at the exit end of the tempering device is typically about 700° F., however, this temperature is not critical. The previously described temperature ranges are the preferred temperatures used in common automobile window glass. Glass of other types and compositions may have a somewhat different softening and quenching temperatures which must be selected appropriately.

Unlike the prior art glass bending devices, the present invention uses a plurality of fixed length belts which must be retracted periodically when the supply of belt on the reel assembly 32 is depleted. In the, preferred embodiment shown, the apparatus is designed so that the belts are retracted after each piece of glass is processed through the apparatus. If small pieces of glass are used or if a very large reel and spool were employed, it would be impossible to process several pieces of glass prior to retracting the belts. While it is obviously much simpler to employ an endless belt so that retracting would not be necessary, endless belts have joints or seams which invariably cause minute surface irregularities in the glass. In order to eliminate the irregularities caused to belt seams, the present invention uses seamless belts which are readily available in the lengths required. The belts are preferably formed of a woven fiberglass material in order to withstand the high temperatures which are achieved in this hostile environment. The belt must be flexible enough to withstand repeated bending as it is wound and unwound about the reel 32 and spool 36 and bent about the inlet/outlet guide bars.

It has been found that it is not necessary to use rollers on the inlet guide bar. The guide bar is preferably formed of a polished steel cylindrical rod. The outlet guide bar is formed of a flexible material so that it may be bent to the desired curvature. Preferably the outlet guide bar is coated with an abrasion-resistant material such as Teflon ™. The Teflon ™ coating is not placed on the inlet guide bar since the inlet guide bar being adjacent the furnace runs at a temperature in excess of the operating temperature of conventional low-friction polymers such as Teflon ™ or the like. Ideally, the inlet and outlet guide bars can be adjusted up and down so that the inlet and outlet of the glass bending apparatus correspond in height with the furnace and tempering device respectively. While an upward or downward slope of the belt array may be achieved, the belts are preferably oriented in a substantially horizontal manner. The height of the inlet guide bar may be adjusted by adjustment lever 48 and the height of the outlet guide bar may be adjusted by moving the outlet guide bar support 50 up and down relative to frame 42 to which is attached to bolts 52.

The bending apparatus is further provided with a pan, 54 which underlies the belt array between the inlet and outlet guide bars and serves to provide a curved support for the belts where the amount of curvature preferably increases from the inlet side of the pan to the outlet side of the pan. The amount of pan curvature, like the outlet guide bar is designed to be adjustable to correspond with the desired shape of the glass being produced. The pan is preferably formed of a stainless steel sheet 56 having reinforcements 58 running axially along both of the sides of the pan. The sheet must be thin enough to be flexible, yet thick enough to support the glass. A 0.018'' thick sheet works satisfactorily.

Three cross-sectional end views of the pan are shown in FIGS. 5–7. The inlet of the pan is supported by adjustment columns 60 which are provided with a screw mechanism 62 and a slider block 64. The reinforcement 58 on each edge of the assembly 54 is attached to the slider block of the adjacent column 62. As adjustment screw 62 is rotated, the slider block and attached pan move up and down so that the desired height may be established. The outlet side of the pan is supported relative to the bending apparatus frame 52 by columns 66 and 66' which are pivotably attached to frame 42. The amount of pan curvature is established by the curvature adjustment mechanism 68 shown in FIG. 7. Arms 70 and 71 are attached to the reinforcements on opposite sides of the pan 64. Arms 70 and 70' are supported on the end of the pan and may be pivotably oriented toward one another to deflect the pan into the concave surface by upper and lower tie rods 72 and 74. Adjustment bolt 72 and 74 are pivotably connected to arm 70' and threadingly engaged arm 70 so that when crank 76 formed on the end of each bolt is rotated the opposite arm ends move transversely relative to one another thereby allowing the curvature of the pan to be adjusted. With reference to FIGS. 6 and 7, when the outlet end of the pan is in the horizontal position, the pan 56, the columns 66 and 66' and the arms 70 and 70' are oriented in the position depicted by the dotted lines. Arms 70 and 70' are further interconnected by shaft 78.

Figure 8:
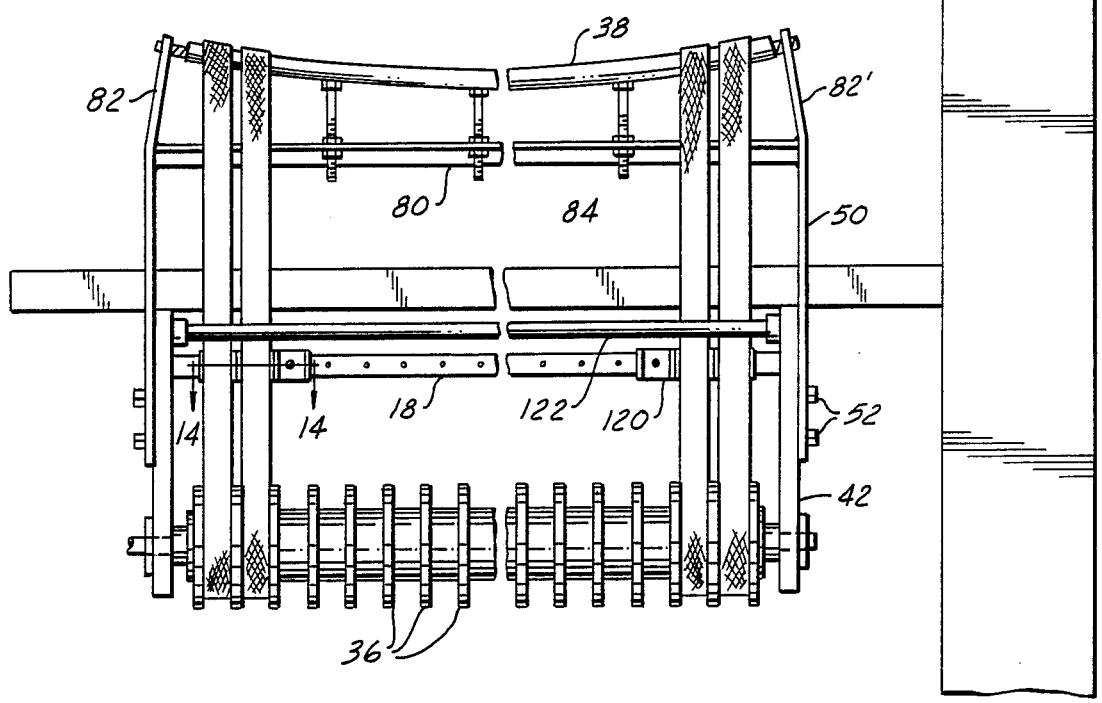
FIG. 8 is an enlarged partial cross-sectional view taken along line 8—8 in FIG. 1.
Figure 9:
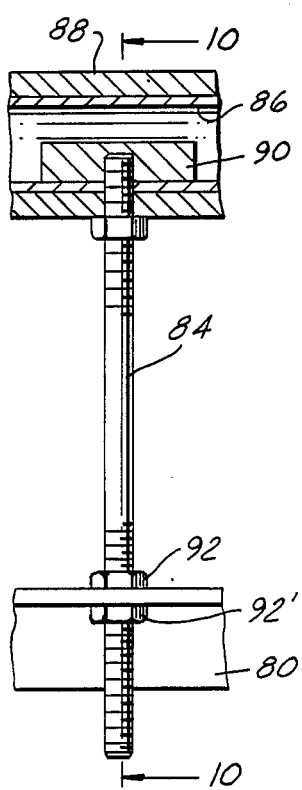
FIG. 9 is an enlarged cross-sectional view of the exit guide curvature adjustment mechanism.
Figure 10:
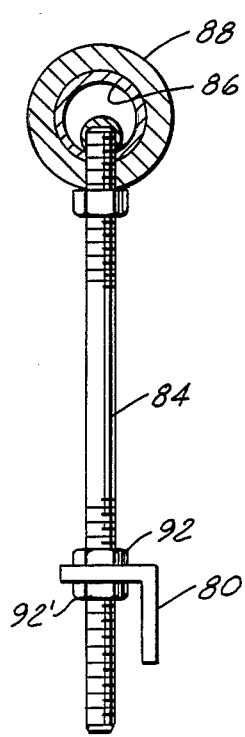
FIG. 10 is a cross-sectional view taken along line 10—10 in FIG. 9.

The outlet guide bar support 50 and the mechanism for adjusting the curvature of the outlet guide bar are shown in greater detail in FIG. 8. The outlet guide bar support is generally H-shaped having a horizontal member 80 and vertical member 82 and 82'. A number of curvature adjustment studs are longitudinally spaced along the outlet guide bar 38 to connect the guide bar to horizontal member 84. Curvature adjustment studs 84 provide ample adjustment in the embodiment shown for rates of curvature typically encountered in automobile windows. An enlarged fragmentary view of the outlet guide bar and stud arrangement are shown in FIGS. 9 and 10. The outlet guide bar is preferably formed of a flexible tube 86 having a coaxial external protected sleeve 88 formed of an abrasion resistant polymer such as Teflon TM. Tube 86 is preferably formed of an easily deformable material such as common, helically-wound electrical conduit. Within the conduit are placed a number of blocks 90, having a threaded blind hole formed therein for receiving the stud 84. The stud may then be adjusted relative to horizontal member 80 by a setting nuts 92 to the desired location. Note that the curvature of the outlet guide bar need not be constant. While the pan curvature is generally symmetrical about a central axis, using the adjustment mechanism described the curvature of the guide bar is not so limited. Since the outlet guide bar is the last part of the bending apparatus to touch the glass the shape of the outlet guide bar will substantially determine the ultimate curvature of the glass article being formed. While similar adjustment on the pan contour could be easily provided, such mechanism is not necessary in the formation of typical automotive side windows.

Figure 11:
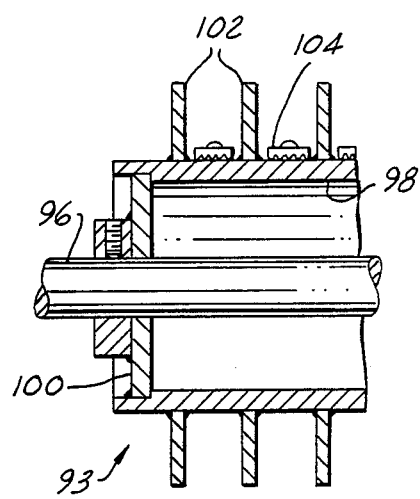
FIG. 11 is an enlarged cross-sectional view of the belt take-up spool assembly.
Figure 12:
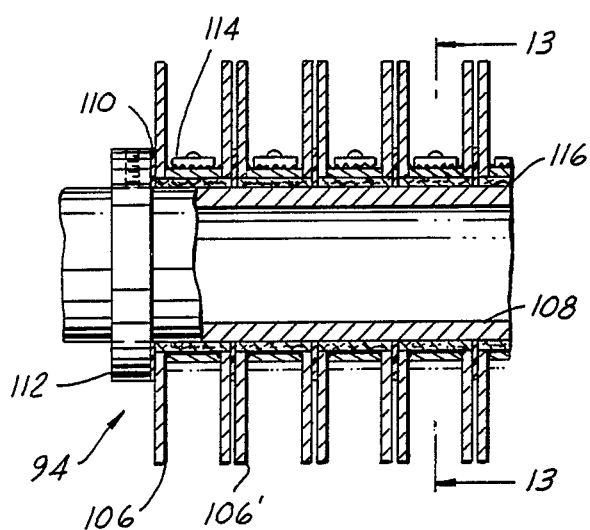
FIG. 12 is an enlarged cross-sectional view of the belt reel assembly.

FIGS. 11 and 12 show cross-sectional views of the take-up spool 93 and the belt reel assembly 94. Take-up spool 93 is concentrically mounted upon and fixed to spool drive shaft 96. The spool assembly is made up of cylindrical member 98 and end plate 100. Flanges 102 and clamps 104. Each of the belt ends are attached to the take-up spool using clamp 104. When all the belts are attached the spool is rotated to load each of the spool segments between adjacent flanges with the desired length of belt material. The belt reel assembly 94 is of a generally similar design, however, each individual belt is provided with an individual reel 106 mounted on a common reel drive shaft 108. A friction element is located between each independent reel 106 and the drive shaft 108 to allow the reel to be rotated relative to the drive shaft and the other belt reels. Spacers 110 are provided between the adjacent reels and the end reels and end plate 112. In order to maintain the reels independent, the spacers are preferably made of a non-abrasive material having a low friction coefficient such as Teflon TM or the like to insure the belt reels move independently. Each individual reel 106 is provided with a clamp 114 for attachment of the belt end to the reel. With all of the belt ends attached to their respective reels, the entire assembly may be rotated until the belts are tight. Note that if one belt is too short it will become tight before the others. As the drive shaft is rotated further after the shortest belt becomes taut, the reel associated with the shortest belt will slip relative to the shaft as a result of the friction element 116 therebetween. Each individual reel 106 is provided with its own independent friction element 116. The friction element further provides a high-belt tension safety mechanism to prevent the belts from breaking in the event the rotation of the reel and spool assemblies are not properly coordinated.

Figure 13:
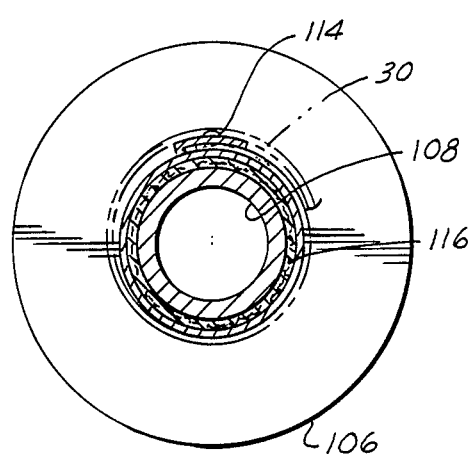
FIG. 13 is a cross-section of the belt reel taken along line 13—13 in FIG. 12.

FIG. 13 shows a cross-sectional view of the reel assembly further showing how the belt 30 is attached to the reel 106 by clamp 114. Clamp 114 is a simple bracket which pivots about one end and is provided with a central screw for attachment to the reel. The end of the belt is inserted on the end of the clamp opposite the pivot point and the screw is tightened.

Figure 14:
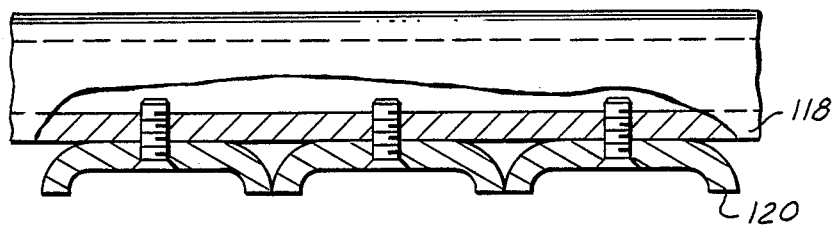
FIG. 14 is an enlarged cross-sectional view of the belt guide taken along line 14—14 in FIG. 8.

In order to maintain the belts in proper spaced apart relation, both the inlet and exit ends of the bending apparatus are provided with belt guides. The guides are generally similar and a detail of the belt guide is shown in FIGS. 8 and 14. The belt guide consists of a track bar 118 which is provided with a plurality of generally U-shaped belt guides 120. Directly above the track bar is retaining bar 122 which firmly keeps each of the belts oriented within its respective U-shaped guide. The guides 120 are preferably formed of a low-friction material such as Teflon TM or the like, however, polished stainless steel would also work quite satisfactorily. As shown in the preferred embodiment, the bending apparatus is provided with 15 belts, each approximately 1½ inches wide and spaced approximately ½ inch apart. The number and size of the belts can be varied accordingly depending upon the size of the glass sheets desired to be formed. The apparatus described in the preferred embodiment is designed to bend glass used for automobile door and side windows.

Automobile door and side windows are curved primarily only about a single axis, however, sometimes a slight compound curve is required. The bending apparatus described in the preferred embodiment can achieve slight compound curves by adjusting the pan height relative to the inlet and outlet guide bars to allow the belts to form a slightly concave surface in the side view (FIG. 1). Substantial compound curves, such as that required for some automobile rear windows cannot be fabricated using this apparatus and a sag technique. The device, however, can be modified by installing a upper and lower press assembly as described in U.S. Pat. No. 4,441,909. With the apparatus modified to include a press assembly, the belts and glass would obviously have to stop momentarily during the pressing operation. The advantages of the apparatus, i.e., the lack of glass irregularities caused by belt seams is just as important whether the glass is bent by sagging or by pressing.

Figure 15:
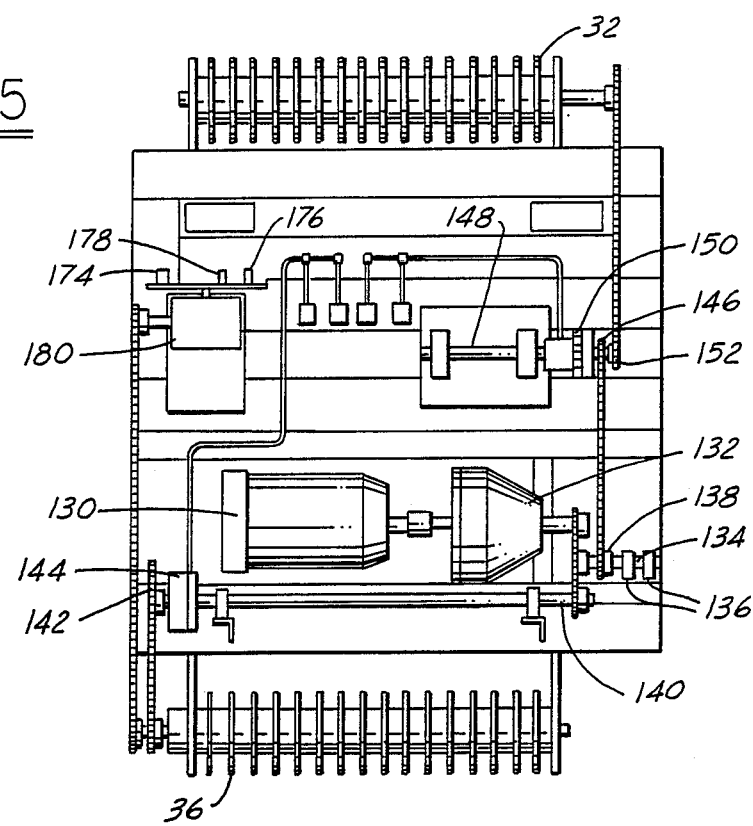
FIG. 15 is a top sectional view taken along line 15—15 of FIG. 4.

A plan view of the bending apparatus drive mechanism is shown in FIG. 15. The device is powered by a 1-hp D.C. motor 130. The D.C. motor is used to achieve smooth acceleration and deceleration control. The output of the motor 130 is connected to gear box 132. A high reduction ratio is required and the gear box employed has a reduction ratio of 38.4 to 1. The output of the gear box is connected to intermediate shaft 134 by a pair of cooperating gears. Intermediate shaft 134 is mounted on a pair of pillow blocks 136 and is provided with a sprocket 138. The intermediate shaft drive gear, in addition to cooperating with the gear box drive gear engages a gear on spool clutch shaft 140. Spool clutch shaft is pivotably mounted on a pair of bearings and is provided with an output sprocket 142 controlled by a pneumatic clutch assembly 144. Sprocket 142 is connected to the take-up spool assembly 36 by a drive chain.

Sprocket 138 intermediate shaft 134 is connected to sprocket 146 on reel clutch 148 mounted on reel clutch shaft 150. The output sprocket 152 of reel clutch 150 is intermittantly coupled to the motor by varying the input pneumatic pressure to the clutch unit. Output sprocket 152 is connected to the reel assembly 32 by a drive chain. When viewing the motor side elevation in FIG. 1, the shaft rotates clockwise which causes the reel assembly 32 to be driven counter-clockwise and spool assembly 36 to be driven clockwise. Whenever the belts are to be moved the motor is energized and the appropriate clutch assembly activated to cause the belts to move in the appropriate direction. To maintain tension on the belts, air pressure is supplied to both clutches. One receives a high-pressure signal and the other a low-pressure signal thereby allowing the high-pressure clutch to be locked up and the low-pressure clutch to slip providing sufficient resistance to maintain desired belt tension.

Figure 16:
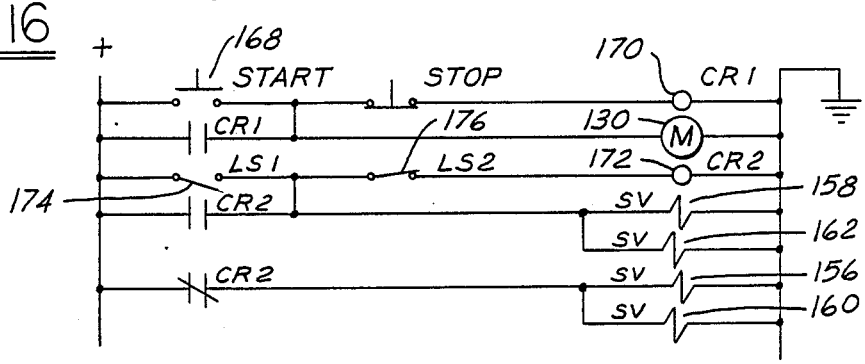
FIG. 16 is a schematic diagram of the electrical circuit of the apparatus.
Figure 17:
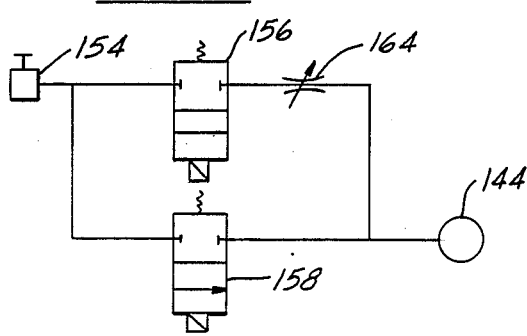
FIG. 17 is a schematic diagram of the drive mode hydraulic circuit.
Figure 18:
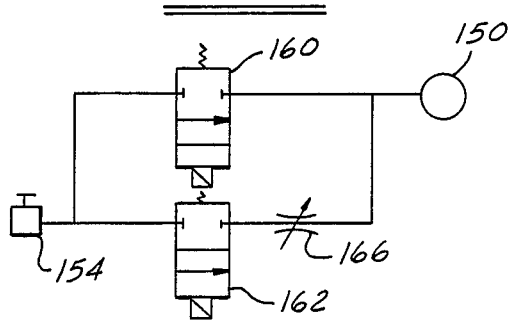
FIG. 18 is a schematic diagram of the retract mode of the hydraulic circuit.

Electrical schematic of a typical electrical circuit is shown in FIG. 16 and a schematic of the typical pneumatic circuits are shown in FIGS. 17 and 18. FIG. 17 shows the pneumatic circuit regulates the pressure of air supplied to the drive clutch 44 and FIG. 18 shows a pneumatic circuit supplying air to the rewind clutch or spool clutch 150. Air is supplied to both pneumatic circuits using typical shop air as a regulated air source 154. Oriented in parallel between the air source and each clutch are a pair of electrically operated solenoid valves. Valves 156 and 158 in FIG. 17 are associated with the drive clutch, and solenoid valves 160 and 162 in FIG. 18 are associated with the retract clutch. Valves 156 and 162 have a regulated output as shown by pressure regulators 164 and 166 in the pneumatic circuit. When solenoid valve 158 is energized, full air pressure is supplied to clutch 144. When valve 158 is closed and 156 is energized, a low-pressure air signal will be supplied to clutch 144. The retract clutch circuit functions in a similar manner. When solenoid valve 160 is open full pressure is transmitted to clutch 150 and when 160 is closed and 162 is open, a low-pressure signal is transmitted to clutch 150.

The solenoid valves 156 through 162 are shown in schematic in FIG. 16. The device is activated when the start switch 168 is closed. Start switch in turn activates control relay 170 (CR1) in turn activates motor 130. Initially the control relay 172 (CR2) is not closed as shown in the schematic when control relay 172 is open solenoid valves 158 and 162 are activated resulting in a high pressure signal to the drive clutch 144 and low pressure signal to retract clutch 150 causing the belts to advance. When the belts advance sufficiently to trip a limit switch, control relay closes and solenoids 158 and 162 are activated causing the belts to retract. Limit switches 174 and 176 are positioned to be activated by a finger 178 projecting from the output of a worm gear box 180. Gear box 180 is mechanically coupled to spool assembly 32 by way of a chain and sprocket mechanism. Gear box 180 has a high reduction ratio of approximately 20 to 1. When finger 178 reaches limit switch 176, the belts are retracted and when the finger reaches limit switch 174, retraction is complete and the device is stopped until a new start signal is received.

As previously mentioned, the starting of the belt advancement cycle must be carefully coordinated with the position of the glass within the furnace. If the belts start too slow, the soft glass will hit the stationary belts causing bending and scuffing. If the belts start too late, the glass may not be completely off the belts when retraction starts causing glass scuffing or deformation. To coordinate the starting of the belt movement with glass position, a mechanical ball memory device is employed. Mechanical ball memories are well-known in the art and are therefor not described in detail. It would similarly be possible to control the starting of the bending apparatus movement using an electronic or computerized controller or mechanical or optic glass position sensors. Such devices are quite well-known in the art and are not described in detail.

Using the apparatus described, a novel method of bending glass can be practiced. The method first requires the heating of glass in a furnace to a temperature sufficient to cause to the glass to become plastic. Next the glass is transported from the furnace to a tempering apparatus while supporting it horizontally and moving it along a first axis. The glass is freely supported on a plurality of continuous belt segments. The belt segments provide a curved support for the softened glass which sags to conform to the curvature of the belts while being transported from the furnace to the tempering device. The rate of curvature of the best preferably varies as the glass moves from the furnace to the tempering device with the maximum rate of curvature being adjacent to the tempering device. After the glass has been transported from the furnace to the tempering device, the next step is the retracting of the belts to an initial position so as to receive the next sheet of glass. Employing this method, the glass is always supported on a continuous glass segment free of joints and seams thereby preventing the glass to be marred by belt joints. In a preferred embodiment of the invention, the previously described steps are immediately followed by the rapid cooling of the glass sheet at a rate sufficient to cause tempering to occur.

It will also be understood, of course, that while the form of the invention herein shown and described constitutes a preferred embodiment of the invention, it is not intended to illustrate all possible forms thereof. It will also be understood that the words used are words of description rather than limitation and various changes may be made without departing from the spirit and scope of the invention disclosed.

I claim:

1. A method of sequentially bending glass sheets, comprising the following steps:
    heating a sheet of glass in a furnance to a temperature at which it becomes plastic;
    transporting the glass sheet from the furnace to a tempering apparatus horizontally along a first axis while freely supporting the glass on a conveyor formed of a plurality of continuous belt segments, said belt segments when viewed along the first axis forming a curved support, sagging the softened glass into a curved shape; and
    retracting the belts to an initial position to receive the next sheet of glass to be supported on the same continuous belt segments thereby preventing the glass from being marred by irregularities caused by belt joints.

2. The method of claim 1 further comprising the step of rapidly cooling the curved sheet of glass.

3. The method of claim 2 wherein during the heating step the glass is heated to a temperature sufficient to allow the glass to sag under its own weight to the contour of the conveyor while maintaining sufficient rigidity to allow handling.

4. The method of claim 3 wherein during the heating step the glass is heated to approximately 1200° F.

5. The method of claim 3 wherein during the transporting step the glass temperature is maintained above the upper limit of the annealing temperature range.

6. The method of claim 3 wherein during the cooling step the glass is rapidly cooled to the lower limit of the annealing temperature range at a rate sufficient to cause the glass to temper.

7. The method of claim 2 wherein:
    during the heating step the glass is heated to approximately 1200° F.;

during the transporting step the glass is not allowed to cool below 1050° F.; and during the cooling step the glass is rapidly cooled to 950° F. at a rate sufficient to cause tempering.

8. An apparatus for bending glass sheets which have been heated to a softened state and for transporting the glass sheets in the softened, bent condition to a cooling device, said apparatus comprising:

a conveyor means for carrying the softened glass sheet generally horizontally along a first axis, said conveyor means formed of a plurality of belts arranged adjacent in generally parallel relationship to said first axis;

inlet guide means for supporting the conveyor belts to form a glass inlet;

outlet guide means for supporting the conveyor belts to form a curved glass outlet with said conveyor means extending between said inlet and outlet guide means to establish a glass supporting surface;

drive means for advancing the conveyor means and the glass supported thereon from the region of the inlet guide means to the region of the outlet guide means during which movement the glass sags to conform with the curvature of the outlet guide means; and retractor means for retracting the conveyor to an initial position in order to receive another sheet of glass.

9. The apparatus of claim 8 further comprising a pan underlying the conveyor means and generally supporting the belts between the inlet and outlet guide means.

10. The invention of claim 9 wherein said pan is curved along an axis parallel to the conveyor means first axis.

11. The invention claim 10 wherein said pan curvature varies with respect to the first axis, with the curvature of the pan being greatest adjacent to the outlet guide means.

12. The invention of claim 8 wherein said outlet guide means further comprises a flexible member having a variable degree of curvature for supporting a plurality of belts cooperating therewith.

13. The invention of claim 8 wherein each of the belts are provided with a first and second end and a length therebetween which is continuous and free of irregularities.

14. The invention of claim 13 further comprising:

a rotatable belt reel to which each of the first ends of the belts are attached and wound thereabout in response to the rotation of the belt reel by the retractor means; and a rotatable belt spool assembly having the second ends of said belts attached thereto, said belts being wound about the spool as the spool is rotated by the drive means;

wherein said belt spool and belt reel rotate in unison to cause the belts extending therebetween to advance or retract.

15. The invention of claim 10 further comprising pan adjustment means for adjusting the curvature of the pan and for maintaining the pan in a fixed, curved orientation during glass bending.

16. The invention of claim 15 further comprising:

pan adjustment means for varying the curvature of the pan and for maintaining same during glass bending; and outlet guide adjustment means for varying the curvature of the outlet guide and maintaining same during glass bending, thereby enabling the curvature of the glass which is formed to be varied as desired.

17. An apparatus for bending glass sheets which have been heated to a softened state in a furnace, and for transporting the glass sheets in the soft, bent condition to a cooling device, said apparatus comprising:

conveyor means for carrying a soft glass sheet generally horizontally along a first axis extending between the furnance and the cooling device, said conveyor means being formed of a plurality of conveyor belts arranged generally parallel and ajacent to one another and the first axis;

inlet guide means for suppoting the conveyor belts to form a glass inlet;

outlet guide means for supporting the conveyor belts to form a curved glass outlet with said conveyor means extending between said inlet and outlet guide means to establish a glass supporting surface, the contour of which conforms at the inlet to the inlet guide means, and at the outlet to the outlet guide means;

a pan oriented between the inlet and outlet guide means for supporting the conveyor belts extending therebetween, and the softened glass sheet carried thereon to define a curved support surface, said pan being curved about an axis generally parallel to the first axis;

drive means for advancing the conveyor means and the glass superheated thereon from the region of the inlet guide means to the region of the outlet guide means, during which movement the glass sags to conform to the contour of the outlet guide means;

retractor means for retracting the conveyor means to the initial position in order to receive another sheet of glass; and control means for controlling the operation of the drive means and retractor means responsive to the exiting of a sheet of softened glass from the furnace.

18. The invention of claim 17 wherein said pan and said outlet guide means are formed of flexible material enabling the curvature of the glass to be varied as desired.

19. The invention of claim 18 further comprising pan adjustment means for adusting the curvature of the pan and for maintaining the pan in a fixed, curved orientation during glass bending.

20. The invention of claim 19 further comprising an outlet guide adjustment means for varying the curvature of the outlet guide and for maintaining the fixed shape of the outlet guide during glass bending.

* * * * *